Figure 1:
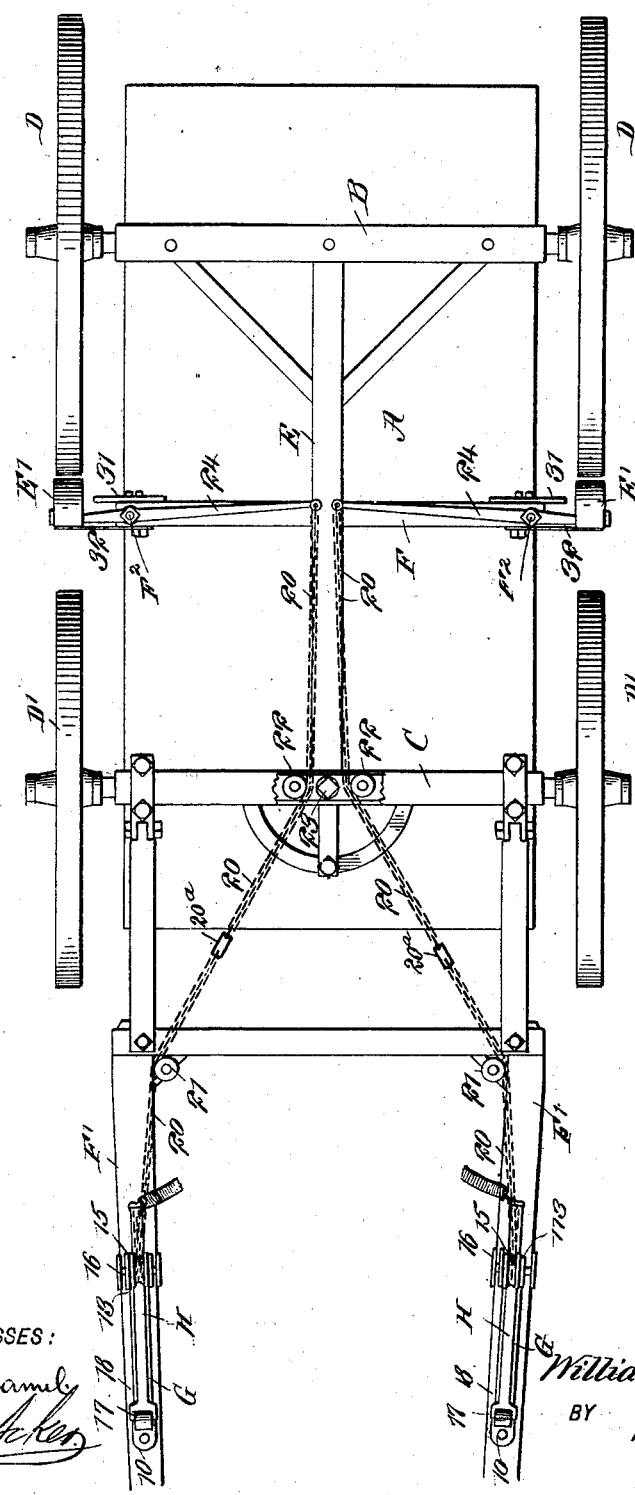

No. 702,287. Patented June 10, 1902.
W. A. CRITCHLOW.
VEHICLE BRAKE.
(Application filed Sept. 13, 1901.)
(No Model.) 2 Sheets—Sheet 1.

WITNESSES:
James F. Duhamel
[signature]

INVENTOR
William A. Critchlow
BY
[signature]
ATTORNEYS

No. 702,287. Patented June 10, 1902.
W. A. CRITCHLOW.
VEHICLE BRAKE.
(Application filed Sept. 13, 1901.)
(No Model.) 2 Sheets—Sheet 2.
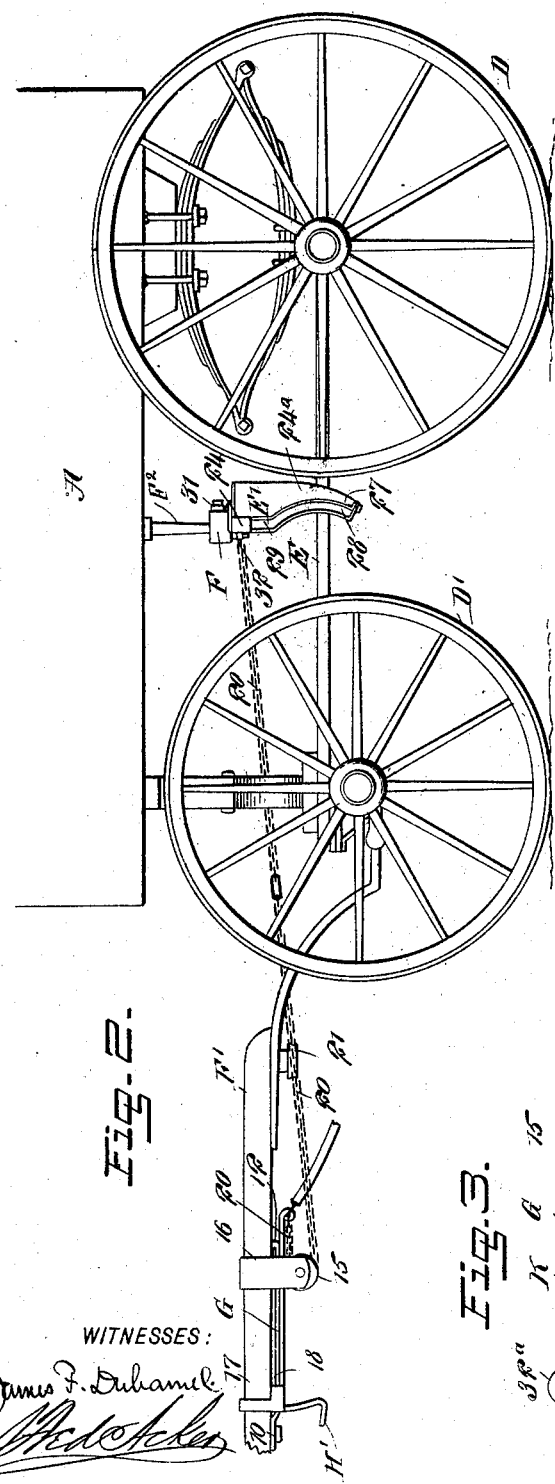
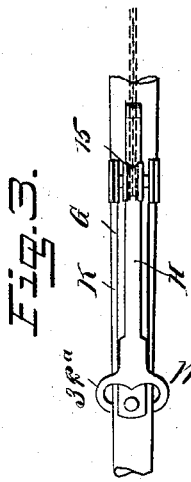
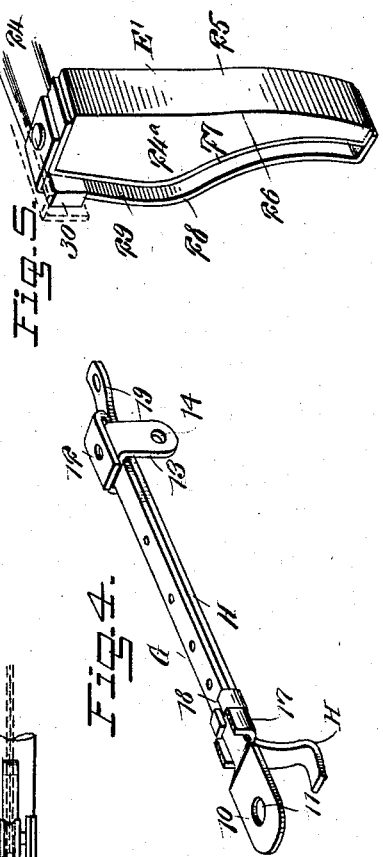
WITNESSES:
INVENTOR
William A. Critchlow
BY
ATTORNEYS
THE NORRIS PETERS CO., PHOTO-LITHO., WASHINGTON, D. C.

UNITED STATES PATENT OFFICE.

WILLIAM ARTHUR CRITCHLOW, OF VANCOUVER, CANADA.

VEHICLE-BRAKE.

SPECIFICATION forming part of Letters Patent No. 702,287, dated June 10, 1902.

Application filed September 13, 1901. Serial No. 75,273. (No model.)

*To all whom it may concern:*

Be it known that I, WILLIAM ARTHUR CRITCHLOW, a subject of the King of Great Britain, and a resident of Vancouver, in the Province of British Columbia and Dominion of Canada, have invented a new and Improved Vehicle-Brake, of which the following is a full, clear, and exact description.

The purpose of this invention is to provide a brake of simple, economic, and durable construction arranged to be automatically brought into action by the pressure of the neck-yoke, saddle, back-strap, and breeching when the horse or team is holding back and to so construct and hang the brake-shoes that the brakes will be off when the horse or team pulls ahead or when the vehicle is backed.

Another purpose of the invention is to provide a brake mechanism of the character described which will be applicable to a single or to a double rig.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a bottom plan view of a single-horse vehicle having the improvement applied. Fig. 2 is a side elevation of the vehicle and improved brake. Fig. 3 is a bottom plan view of a tongue, illustrating the application of the improvement thereto. Fig. 4 is a perspective view of a portion of the device adapted to be applied to the tongue or pole of a vehicle, and Fig. 5 is a perspective view of one of the brake-shoes and a part of the brake-beam.

A represents the body of a vehicle provided with the usual running-gear, of which B represents the rear axle; C, the front axle; D and D', respectively, the rear and forward supporting-wheels; E, the reach; E', the brake-shoes, and F the brake-beam.

F' represents the shafts of the vehicle, attached thereto in any approved manner. Near the inner end of each shaft a plate G is attached at its forward end to the shaft. Each plate G is provided with a head-section 10, having an aperture 11 to receive a screw or bolt, the head being offset upward beyond the body portion of the plate, which body portion is preferably narrower than the head, and at the rear of each plate a forwardly and upwardly returned member 12 is formed and when the plate is secured to the shaft will engage with the under face of the shaft, as is shown in Fig. 2. The body portion of each plate G is provided with opposing downwardly-extending ears 13 nearer its rear than its forward end, and these ears have openings 14 produced therein adapted to receive the trunnions of a roller 15, as is shown in Figs. 1 and 2. These trunnions pass likewise through yokes 16, which extend over the ears 13 and likewise over the shafts, and the upwardly-returned member 12 serves to strengthen the ears 13. Preferably the body portion of each plate G is downwardly curved or downwardly bent at its longitudinal edges, and beneath the body portion of each plate G a slide H has end movement, being in engagement with the downturned edges of the plates G; but the surface of the plates G, against which the slides have movement, may be straight, if desired. Each slide H preferably has its forward end downwardly turned, as shown at H' in Fig. 4, and a yoke-strap 17 extends upward from the forward end of each slide H loosely over a shaft F', while adjacent to each yoke-strap 17 each slide is provided at each edge with an upwardly-extending guide-lip 18, adapted to travel upon the longitudinal upper edge surfaces of the plates G, and at the rear end of each slide H an eye 19 or its equivalent is formed. One end of a rope or chain 20, or the equivalent thereof, is attached to each slide H at the rear end of said slide, and these ropes or chains 20 are carried forward and then over the guide-pulleys 15 and likewise in engagement with guide-pulleys 21, located at a point where the shafts connect with their cross-bars. From these pulleys 21 the ropes or chains 20 are carried over another set of guide-pulleys 22, located one on each side of the king-bolt 23, to an engagement with the inner ends of levers 24, which levers are fulcrumed between their centers and outer ends upon the under face of the brake-beam F, supported by one or more brackets F², as is shown in Figs. 1 and 2. Turnbuckles 20ᵃ or their equivalents are provided in the chains 20 to take up any slack or for any required purpose. This arrangement is particularly adapted for a vehicle in which shafts are employed; but the improvement may be adapted with equally good results to a vehicle in which a pole or tongue is used instead of shafts.

The brake-shoes E', one of which is shown in detail in Fig. 5, consist of a body-block $24^a$, the upper rear longitudinal face whereof is straight, but the lower longitudinal rear face 25 is more or less convexed. This surface is adapted for engagement ordinarily with the rear wheels of the vehicle. The upper portion of the forward face of the body-block of each brake-shoe is also more or less straight, while the lower portion 26 of the forward face of each body-block is more or less concaved, as is shown in Figs. 2 and 5. Preferably the forward face of each brake-block $24^a$ is provided with an attached metal strap 27, extending from its bottom to its top, conforming to the forward contour of the brake-block to which it is applied. In addition to this strap 27 a second strap 28 is employed, located at the forward portion of each brake-shoe, the forward straps 28 conforming in shape to the rear straps 27. A space 29 intervenes the two straps 27 and 28 of each brake-shoe. The outer ends of the levers 24 extend through the spaces 29 between the straps 27 and 28 of the brake-shoes, and the outer extremities of the levers 24 are provided with heads 30, which prevent the brake-shoes from leaving the levers. The brake-shoes are not therefore directly connected with the brake-beam F, but are carried by the levers 24. When the animal holds back, the inner ends of the levers through the medium of the ropes or chains 20 are drawn forwardly and the brake-shoes are applied to the rear wheels, checking the movement thereof; but when an animal or team is backed for the purpose of causing the vehicle to travel backward the brake-shoes, should they come in contact with the rear wheels, will ride upward on the levers 24 and will exert no braking action on the wheels, and when the vehicle is drawn forward the brake-shoes will assume their normal position out of engagement with the wheels. It will be understood that the slides H are connected with the holdback-straps or breeching of the harness, the attachment being at the rear ends of the slides. When it is desired to keep the team at a standstill or on a hill, L-shaped bolts are slid out from the felly and clipping the forward upper corners of the brake-shoes keep them from rising or leaving the wheel, as is shown in dotted lines in Fig. 5.

In Fig. 3 I have illustrated the application of the device to a pole or tongue K, in which it will be observed that the slide H is provided with an eye $32^a$ at its forward end, which receives the pole or tongue and likewise the forward portion of the plate H, attached to the under face thereof.

It will be understood that the brake-shoes may be applied to the forward wheels of a vehicle, if desired, and that one or more slides H may be employed, and the connection between the slides and levers may be varied according to the character of the vehicle to which the application is made.

Having thus described my invention, I claim as new and desire to secure by Letters Patent—

1. In vehicles, the combination, with the running-gear, including a brake-beam, levers fulcrumed on the brake-beam, brake-shoes carried by the said levers and having vertical movement thereon, a draft device connected with the running-gear, slides carried by the draft device, guides for the said slides, ropes or chains connected with the said slides, pulley-guides for the ropes or chains, a connection between the ropes or chains and the inner ends of the said levers, bolts mounted on the brake-beam and adapted to be passed over the upper portion of the brake-shoes, and means, substantially as described, for preventing the brake-shoes from leaving the said levers, as and for the purpose specified.

2. In vehicles, the combination, with the running-gear thereof including the brake-beam and shafts, or a pole, of guide-plates attached to the under faces of the shafts, slides mounted to travel on the said guide-plates, friction-rollers carried by the said plates, ropes or chains attached to the rear ends of the slides and passed over the said friction-rollers and friction-rollers located on the running-gear, the rear ends of the slides being adapted for attachment to the holdback portion of a harness, levers fulcrumed upon the brake-beam and connected with the said ropes or chains, brake-shoes having a convexed lower rear face, a concaved lower front face, and an opening at the forward portion, extending from top to bottom and conforming to the contour of the brake-shoe at such point, the outer ends of the said levers being passed through the said opening, and bolts carried by the brake-beam and adapted to be passed over the upper ends of the brake-shoes, for the purpose described.

In testimony whereof I have signed my name to this specification in the presence of two subscribing witnesses.

WILLIAM ARTHUR CRITCHLOW.

Witnesses:
L. EDWIN DUDLEY,
C. EDDIE.